United States Patent

Mohri et al.

[15] 3,697,904

[45] Oct. 10, 1972

[54] UHF TUNER

[72] Inventors: Etsuzo Mohri, Osaka; Toshio Hayakawa, Kadoma; Akira Nishikawa, Suita, all of Japan

[73] Assignee: Matsushita Electric Industrial Co., Ltd., Osaka, Japan

[22] Filed: Sept. 8, 1970

[21] Appl. No.: 70,160

[30] Foreign Application Priority Data

| | | |
|---|---|---|
| Sept. 20, 1969 | Japan | 44/74813 |
| Sept. 20, 1969 | Japan | 44/74814 |
| Sept. 20, 1969 | Japan | 44/89831 |
| Sept. 20, 1969 | Japan | 44/89832 |

[52] U.S. Cl. ........................334/51, 334/58, 334/78, 74/10.54, 74/10.8

[51] Int. Cl. ..............................................H03j 5/02

[58] Field of Search..........334/50, 51, 78, 84, 57, 58; 74/10.54, 10.8

[56] References Cited

UNITED STATES PATENTS

| | | | |
|---|---|---|---|
| 3,188,871 | 6/1965 | Mentzer | 334/51 X |
| 3,218,589 | 11/1965 | Delp | 334/51 |
| 3,248,674 | 4/1966 | Fulton | 334/51 |
| 3,177,432 | 4/1965 | Kelln | 334/51 X |
| 3,495,196 | 2/1970 | Fulton | 334/51 |
| 3,474,362 | 10/1969 | Harten | 334/51 |
| 3,253,240 | 5/1966 | Roussin et al. | 334/51 |
| 3,415,127 | 12/1968 | Miner et al. | 334/51 |
| 3,307,414 | 3/1967 | Naber et al. | 74/10.54 X |
| 3,529,478 | 9/1970 | Hayakawa | 74/10.8 |
| 3,618,406 | 11/1971 | Mohri et al. | 74/10.8 |

*Primary Examiner*—Herman Karl Saalbach
*Assistant Examiner*—Saxfield Chatmon, Jr.
*Attorney*—Stevens, Davis, Miller & Mosher

[57] ABSTRACT

A UHF tuner comprising a main channel switch-over shaft, a fine adjustment sleeve slidably and telescopically overlapping the main switch-over and not normally coupled to a fine adjustment mechanism, and a fine adjustment drum accommodated in a housing and slidably mounted on the main switch-over shaft, the fine adjustment drum being provided with a plurality of fine adjustment screws adjacent to the periphery thereof, wherein the rotation of the main switch-over shaft causes the rotation of the fine adjustment drum at a reduced speed through a gear arrangement including a sun gear integrally provided on the main switch-over shaft, planet gears rotatably carried by the fine adjustment drum and an internal gear of the housing. When the fine adjustment sleeve is axially moved, it is coupled with the fine adjustment mechanism through one of the fine adjustment screws and a coupling member associated with said fine adjustment mechanism, thereby enabling fine adjustment by turning the fine adjustment sleeve.

3 Claims, 4 Drawing Figures

E. MOHRI, T. HAYAKAWA
AND A. NISHIKAWA
INVENTORS

BY Stevens, Davis, Miller & Mosher
ATTORNEY

UHF TUNER

This invention relates to preset type UHF tuners.

Prior-art UHF tuners have adopted a continuous tuning system similar to the system used for tuning to radio broadcasting stations. With this system, tuning is extremely difficult as compared to the VHF tuner. Nevertheless, this continuous tuning system has heretofore been satisfactory, because there were only 2 or 3 UHF band channels or stations available for reception in an area. However, where there are an increased number (7 or 8, for instance) of UHF band channels or stations available for reception, a non-continuous or intermittent tuning system as is adopted for the VHF tuner is preferable.

It is most preferable that the UHF tuner can be preset to enable the ready selection of a desired channel merely by turning the main switch-over shaft.

An object of the invention is to provide a UHF tuner comprising a main switch-over shaft coupled with a rotor shaft of a variable capacitor for selecting a desired channel, a fine adjustment sleeve mounted on the main switch-over shaft and normally free from the coupling with a fine adjustment mechanism, and a fine adjustment drum slidably mounted on the main switch-over shaft and provided adjacent to its periphery with a plurality of fine adjustment screws adopted to confront a coupling member associated with said fine adjustment mechanism.

The invention will now be described in conjunction with a preferred embodiment thereof with reference to the accompanying drawings, in which.

Figure 1:
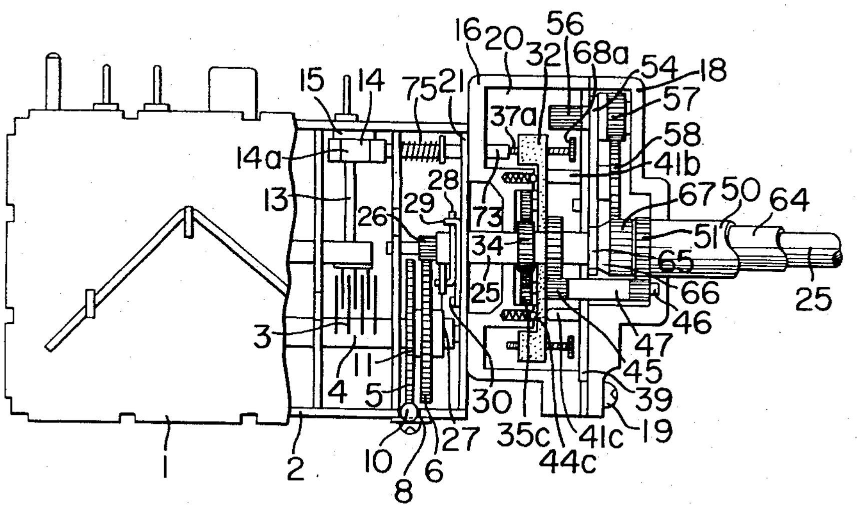
FIG. 1 is a side elevation, partly in section, 1 showing a preferred embodiment of the invention.
Figure 3:
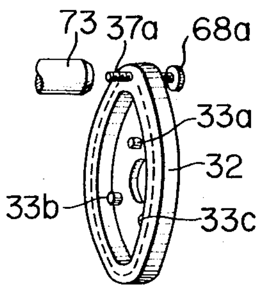
FIG. 3 is a perspective view showing a fine adjustment drum of the embodiment of FIG. 1.

Referring now to the drawings, reference numeral 1 designates a UHF tuner proper. Rotatably disposed within its casing 2 is a rotor shaft 4 for controlling the capacitance of a tuning variable capacitor 3. The rotor shaft 4 rotates together with a switch-over cam disc 5 and a gear 6 both secured thereto. The switch-over cam disc 5 has peripheral indentations 11, against which is urged a ball 10 retained within an opening 9 formed in the wall of the casing 2 by an urging plate spring 8 secured at its end remote from the ball 10 by a bolt 7 to the casing 2. The rotor shaft 4 may thus be rotated intermittently or in a nodal fashion as the ball 10 is engaged in and gets out of the successive indentations 11 of the switch-over cam disc 5.

The variable capacitor 3 has its stationary part 12 connected to one end of a coaxial cable means 13, which is coupled at its other end through a fine adjustment variable capacitor for instance a piston-cylinder type capacitor 14, to a disc capacitor 15.

To the front wall 21 of the casing 2 is secured by bolts 17 a rear housing half 16, to which is in turn secured by bolts 19 a front housing half 18. The housing halves 16 and 18 define an enclosed space 20.

Rotatably supported in the housing halves 16 and 18 is a main switch-over shaft 25, which extends through a bearing hole 22 formed in the front housing half 18, a bearing hole 23 (not shown) formed in the rear housing half 16 and a bearing hole 24 formed in the front wall 21 of the casing 2. The main switch-over shaft 25 is provided with an integral gear 26 meshing with the gear 6 integral with the rotor shaft 4. A stopper pin 27 extends from the rotor shaft 4 for successive engagements, as the rotor shaft 4 is rotated, with stopper members 28 and 29 fitted on the rotor shaft 4. The stopper member 29 is adopted to be brought into engagement with a bent projection 30 rearwardly protruding from the front wall 21 of the casing 2 to stop the rotor shaft 4, thereby restricting the rotation thereof to 2.5 rotations.

The rear housing half 16 is provided on its inside with an internal gear 31 meshing with planet gears 35*a*, 35*b* and 35*c*, which are rotatably mounted on respective pins 33*a*, 33*b* and 33*c* provided on a fine adjustment drum 32 rotatably mounted on the main switch-over shaft 25, and which mesh with a sun gear 34 integral with the main switch-over shaft 25. The rotation of the main switch-over shaft 25 is thus accompanied by the rotation of the fine adjustment drum 32 in the same direction at a reduced rotational speed; the fine adjustment drum 32 is made to complete nearly one rotation with 2.5 rotations of the main switch-over shaft 25.

The fine adjustment drum 32 is formed adjacent to its periphery with a plurality of radially spaced threaded holes 36*a*, 36*b*, 36*c*, . . . ., through which are screwed respective fine adjustment screws 37*a*, 37*b*, 37*c*, . . . . . There are actually provided 25 such threaded holes 36*a*, . . . . . and the same number of the fine adjustment screws 37*a*, . . . . . in case of conforming to the channels authorized in Japan.

The rear housing half 16 is provided with notches 38*a*, 38*b* and 38*c* formed around its front opening and receiving respective radial extensions 4 *a*, 40*b* and 40*c* of a fine adjustment plate 39. Thus, the fine adjustment drum 32 is completely accommodated within the rear housing half 16. The main switch-over shaft 25 rotatably penetrates through the fine adjustment plate 39. The fine adjustment plate 39 is provided with pins 41*a*, 41*b* and 41*c* in engagement with the front face of the fine adjustment drum 32, against the rear face of which are urged balls 44*a*, 44*b* and 44*c* retained in the urging end of respective compression springs 43*a*, 43*b* and 43*c* received in respective bores 42*a*, 42*b* and 42*c* (bores 42*b* and 42*c* are not shown) formed in the rear housing half 16. Thus, the fine adjustment drum 32 is stably held in position.

The fine adjustment plate 39 is formed with a hole 48, through which rotatably extends an idler shaft 47 provided with gears at the opposite ends thereof. One of the gears, the gear 45, of the idler shaft 47 meshes with a gear 49 integral with the fine adjustment drum 32, while the other gear 46 meshes with a gear 51 of a channel indicator sleeve 50 rotatably mounted on a fine adjustment sleeve 64, which is in turn rotatably mounted on the main switch-over shaft 25. Thus, by the rotation of the fine adjustment drum 32 the channel indicator sleeve 50 is rotated in the same direction through the idler shaft 47.

The fine adjustment plate is also formed with guide slots 52 and 53 for the frictional guidance of a locker arm member 54. The locker arm member 54 carries a pin 55 penetrating through it and supporting gears 56 and 57 at the opposite ends thereof. The gear 57 is in mesh with a gear 58 rotatably mounted on a pin 59 extending from the locker arm member 54. The locker arm member 54 is supported on a pin 60 extending from the fine adjustment plate 39, and is always urged radially outwardly by a spring 62 attached at one end to a pin 61 extending from the fine adjustment plate 39 and at the other end to a pin (not shown) provided on it. The movement of the locker arm member 54 is restricted in that the rear end portion 65 of the fine adjustment sleeve 64, which is rotatably interposed between the main switch-over shaft 25 and channel indicator sleeve 50, extends through an opening 63 formed in the locker arm member 54.

The rear end portion 65 of the fine adjustment sleeve 64 terminates in a flared portion 66, which in turn terminates in a gear portion 67. As the fine adjustment sleeve 64 is advanced in the rearward direction, the flared portion 66 progressively pushes the locker arm 54 in the direction of the arrow against the spring force of the spring 62 until the gear portion 67 of the fine adjustment sleeve 64 is brought into mesh with the gear 58 carried by the locker arm member 54.

Also, as a result of the movement of the locker arm member 54 in the direction of the arrow the gear 56 carried thereby is brought into mesh with one of gears **68*a*, 68*b*, 68*c*, . . . . . integrally provided on the respective fine adjustment screws 37*a*, 37*b*, 37*c*, ..... at the front end thereof. Thus, by depressing and turning the fine adjustment sleeve 50 one of the fine adjustment screws 37*a*, 37*b*, 37*c***, ..... may be screwed in the axial direction.

A rod 73 extends through a hole 69 formed in the rear housing half 16, and holes 70 and 72 respectively formed in the front wall 21 and an inside wall 71 of the casing 2. It is movable in the axial direction, and is urged toward the front by a spring 75 mounted on it and interposed between and forcibly contacting the inside wall 71 and a flange 74 secured to it on its intermediate portion. The front end of the rod 73 is adopted to confront the corresponding end of any one of the fine adjustment screws **37*a*, 37*b*, 37*c*, ..... screwed in the fine adjustment drum 32. The rear end of the rod 73 is integrally provided with a core 76 of the piston-cylinder type capacitor 14. The core 76 can be inserted into and withdrawn out of a stationary part 14*a* of the capacitor 14**.

In the operation of the construction above described, the gear 26 integral with the main switch-over shaft 25 is normally in mesh with the gear 6 integral with the rotor shaft 4. Also, normally the sun gear 34 integral with the main switch-over shaft 25 is in mesh with the planet gears **35*a*, 35*b* and 35*c*, which are in mesh with the internal gear 31 of the rear housing half 16. In this state, by turning the main switch-over shaft 25 to the rotor shaft 4 is rotated through the gears 26 and 6 to vary the capacitance of the variable capacitor 3, thus effecting the tuning to a desired channel. At this time, the tuning to successive channels by the rotation of the rotor shaft 4 can be attained intermittently or in a nodal fashion as the ball 10 is engaged in and gets off the successive indentations 11 in the switch-over cam disc 5**.

Along with the rotation of the main switch-over channel 25 for the successive shaft tuning the fine adjustment drum 32 is also rotated at a reduced rotational speed through the arrangement of the sun gear 34, planet gears **35*a*, 35*b* and 35*c* and internal gear 31 to rotate the channel indicator sleeve 50 through the idler shaft 47, thus effecting the indication of successive channels. At the time of switching successive channels carried out in the above manner there is involved no fine adjustment action, because at this time the gear 67 of the fine adjustment sleeve 64 and the gear 58 carried by the locker arm member 54 are not in mesh with each other and also the gear 56 carried thereby is in mesh with none of the gears 68*a*, ..... of the fine adjustment screws 37*a*, ....., causing no movement of the rod 73**.

When the fine adjustment sleeve 64 is depressed to be advanced in the rearward direction, the locker arm member 54 is moved by the flared portion 66 of the fine adjustment sleeve 64 in the direction of the arrow against the spring force of the spring 62 to bring the gear 67 of the fine adjustment sleeve 64 into mesh with the gear 58 while at the same time bringing the gear 56 into mesh with one of the gears **68*a*, 68*b*, 68*c*, ..... of the fine adjustment screws 37*a*, 37*b*, 37*c*, ..... In this state, by turning the fine adjustment sleeve 64 one of the fine adjustment screws 37*a*, 37*b*, 37*c*, ..... is screwed so that it is moved in the axial direction. When it is moved in the leftward or rearward direction, it reaches the rod 73 and pushes the rod 73 in the rearward direction against the force of the spring 75 to cause the retreatment of the core 76 into the stationary part 14*a* of the piston-cylinder type variable capacitor 14. On the other hand, when it is moved in the rightward or frontward direction, the core 76 in the retreated state is withdrawn out of the stationary part 14*a***. In this manner, fine adjustment may be effected.

Figure 4:
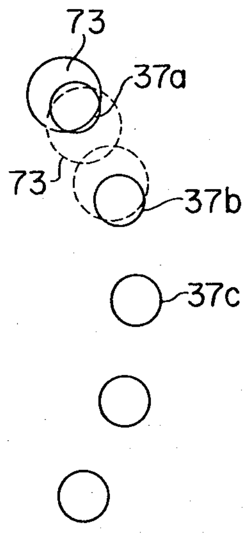
FIG. 4 shows the confronting relation between a rod and fine adjustment screws.
Figure 2:
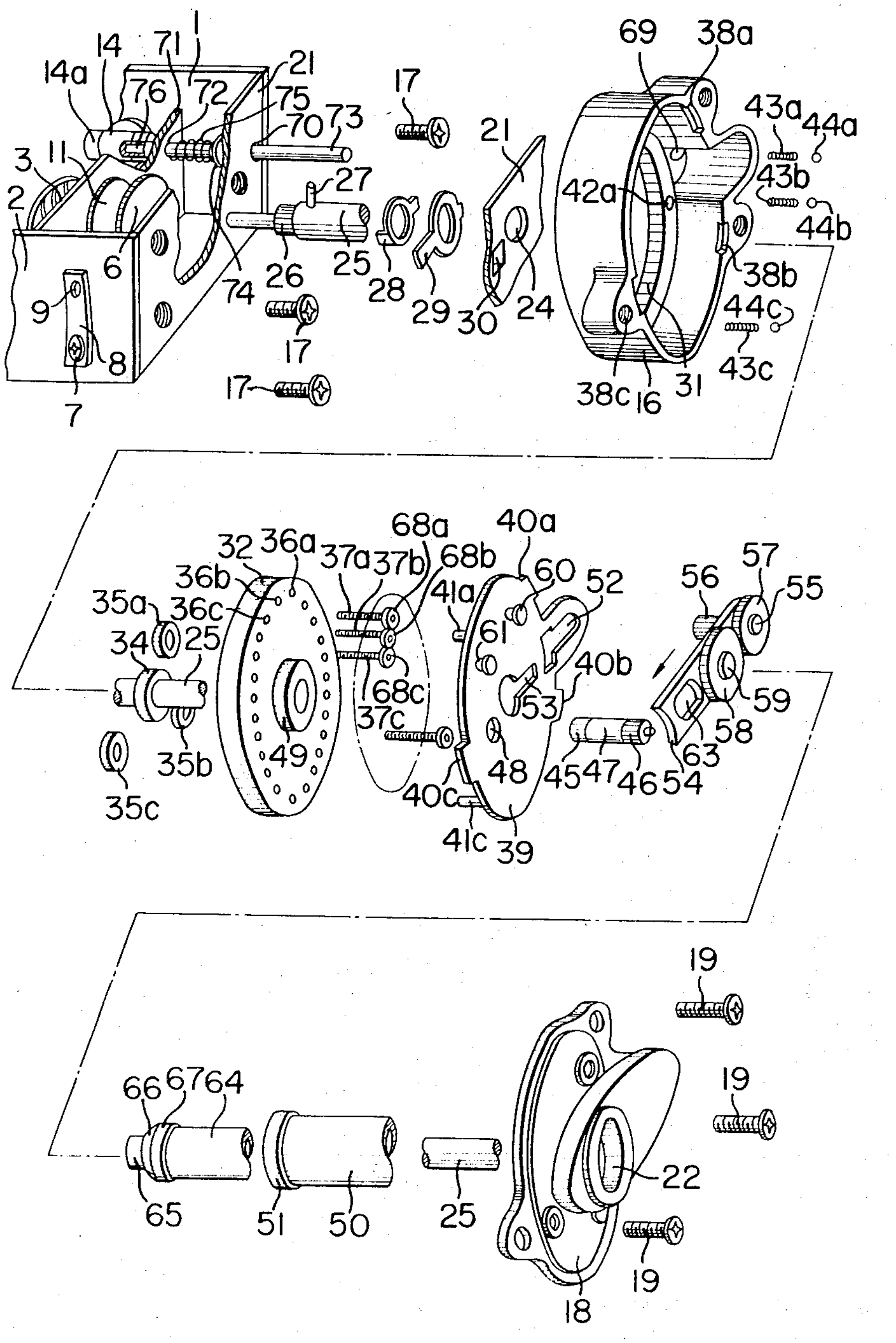
FIG. 2 is an exploded perspective view showing the components of the embodiment of FIG. 1.

As is described, with the UHF turner according to the invention both channel tuning and fine adjustment can be effected independently of each other. In the operation of switching over successive channels, the amount of rotation of the fine adjustment drum 32 corresponding to the amount of rotation of the main switch-over shaft 25 for switching one channel over to the next channel is preset such that the confrontation of the same fine adjustment screw, for instance the screw **37*a*, with the rod 73 is retained for the two adjacent channels, as shown in FIG. 4. This means that if the fine adjustment screw 37*a* confronts with the rod 73 at the time of the fine adjustment of Channel 13, for instance, the confrontation of the former with the latter is retained for the fine adjustment of Channel 14 subsequently switched. Thus, the fine adjustment made for the previous Channel 13 is directly applied to Channel 14**. Although the above description are made for two channels, it is also generally applicable in case of three channels.

Thus, it is possible to receive a channel adjacent to a channel, for which the fine adjustment is made when it is selected, without requiring the fine adjustment, because the preset tuning characteristic curve for the variable capacitor 3 fairly closely approximates the ideal tuning characteristic curve of the UHF tuner.

Also, with the construction described above it is possible to make the fine adjustment unnecessary for channels adjacent to an increased number of fundamental channels by appropriately selecting the amount of rotation of the fine adjustment drum 32 corresponding to the amount of rotation of the main switch-over shaft 25 and the confronting relation between the rod 73 and the fine adjustment screws **37*a*, 37*b*, 37*c***, .....

What is claimed is:

1. A UHF tuner comprising a main switch-over shaft coupled with a rotor shaft of a variable capacitor for selecting a desired channel through a gear mechanism, a fine adjustment drum slidably mounted on said main switch-over shaft and integrally providing a plurality of fine adjustment screws adjacent to the periphery of said main switch-over shaft, a fine adjustment sleeve slidably mounted on said main switch-over shaft, a fine adjustment mechanism integrally mounted on a gear of said fine adjustment screws for moving said fine adjustment sleeve in the axial direction and transmitting the rotation of said fine adjustment sleeve to said fine adjustment screws, a capacitor for fine adjustment of said UHF tuner providing a rod opposite to one of said fine adjustment screws supported by said fine adjustment drum and the capacitance of which being varied by said rod, a spring for pushing said rod in the direction of said fine adjustment screw, a reduced speed mechanism for reducing the speed of said fine adjustment drum in order that the connection of said rod with one of said fine adjustment screws may be maintained against the amount of selecting rotation of at least two channels of said variable capacitor varied by said main switch-over shaft, a desired channel being selected by the combined capacitance of said variable capacitor and said piston-cylinder type capacitor.

2. A UHF tuner according to claim 1, wherein said reduced speed mechanism includes first gear means to cause the rotation of said fine adjustment drum at a reduced rotational speed with the rotation of said main switch-over shaft, said first gear means including a gear integrally provided on said main switching shaft, gears rotatably carried by said fine adjustment drum and an internal gear of a housing, the axial movement of said fine adjustment sleeve being coupled by said fine adjustment mechanism through one of said fine adjustment screws and said rod to enable fine adjustment by turning said fine adjustment sleeve.

3. A UHF tuner according to claim 1 wherein said main switch-over shaft is coupled to said rotor shaft of said variable capacitor for selecting a desired channel through a second gear means, and said rotor shaft is provided with an integral cam disc formed with peripheral indentations, against which is urged a stopper member.

* * * * *